United States Patent
Wang et al.

(10) Patent No.: US 7,348,375 B2
(45) Date of Patent: *Mar. 25, 2008

(54) ELASTOMER COMPOSITES, ELASTOMER BLENDS AND METHODS

(75) Inventors: Ting Wang, Billerica, MA (US); Meng-Jiao Wang, Lexington, MA (US); Glendon A. McConnell, Billerica, MA (US); Steven R. Reznek, Concord, MA (US)

(73) Assignee: Cabot Corporation, Boston, MA (US)

( * ) Notice: Subject to any disclaimer, the term of this patent is extended or adjusted under 35 U.S.C. 154(b) by 243 days.

This patent is subject to a terminal disclaimer.

(21) Appl. No.: 11/098,138

(22) Filed: Apr. 4, 2005
(Under 37 CFR 1.47)

(65) Prior Publication Data

US 2006/0100346 A1    May 11, 2006

Related U.S. Application Data

(62) Division of application No. 10/010,764, filed on Dec. 7, 2001, now Pat. No. 6,908,961.

(51) Int. Cl.
*C08K 3/04* (2006.01)
*C09C 1/50* (2006.01)

(52) U.S. Cl. .................. 524/495; 524/496; 524/449.1; 423/450; 423/455

(58) Field of Classification Search ................ 524/495, 524/496; 423/449.1, 450, 455
See application file for complete search history.

(56) References Cited

U.S. PATENT DOCUMENTS

| | | |
|---|---|---|
| 5,100,637 A | 3/1992 | Nakai |
| 5,554,739 A | 9/1996 | Belmont |
| 5,830,930 A | 11/1998 | Mahumud et al. |
| 5,877,238 A | 3/1999 | Mahmud et al. |
| 5,904,762 A | 5/1999 | Mahmud |
| 5,948,835 A | 9/1999 | Mahmud et al. |
| 6,008,272 A | 12/1999 | Mahmud et al. |
| 6,042,643 A | 3/2000 | Belmont et al. |
| 6,075,084 A | 6/2000 | Mabry et al. |
| 6,110,994 A | 8/2000 | Cooke et al. |
| 6,150,453 A | 11/2000 | Mahmud et al. |
| 6,228,928 B1* | 5/2001 | Soeda et al. .................. 524/495 |
| 6,291,572 B1 | 9/2001 | Brown et al. |
| 6,323,273 B1 | 11/2001 | Mahmud et al. |
| 6,364,944 B1 | 4/2002 | Mahmud et al. |
| 6,365,663 B2 | 4/2002 | Mabry et al. |
| 6,372,822 B1 | 4/2002 | Chung et al. |
| 6,413,478 B1 | 7/2002 | Mabry et al. |
| 6,448,309 B2 | 9/2002 | Mahmud et al. |
| 6,469,089 B2 | 10/2002 | Wang et al. |
| 6,472,471 B2 | 10/2002 | Cooke et al. |
| 6,494,946 B1 | 12/2002 | Belmont |
| 6,627,693 B1* | 9/2003 | Laube et al. .................. 524/495 |
| 6,908,961 B2* | 6/2005 | Wang et al. .................. 524/495 |
| 2002/0086917 A1 | 7/2002 | Chung et al. |
| 2003/0040553 A1 | 2/2003 | Mahmud et al. |
| 2003/0091775 A1 | 5/2003 | Wang et al. |
| 2003/0195276 A1 | 10/2003 | Mabry et al. |
| 2003/0203992 A1 | 10/2003 | Mabry et al. |

* cited by examiner

*Primary Examiner*—Robert D. Harlan

(57) ABSTRACT

Elastomer composites and elastomer blends comprising particulate fillers having selected structure and surface area values are disclosed as well as elastomer composites and elastomer blends having improved properties. Methods of making and using elastomer composites and elastomer blends are also disclosed.

14 Claims, No Drawings

ELASTOMER COMPOSITES, ELASTOMER BLENDS AND METHODS

CROSS-REFERENCED APPLICATIONS AND PRIORITY CLAIM

This application claims the benefit of, and is a divisional application of, U.S. application Ser. No. 10/010,764 filed on Dec. 7, 2001 now U.S. Pat. No. 6,908,961.

FIELD OF THE INVENTION

Certain aspects of the present invention relate to elastomer composites and elastomer blends. Other aspects relate to novel methods of making elastomer composites and elastomer blends.

BACKGROUND

Numerous products of commercial significance are formed from elastomeric compositions wherein particulate filler is dispersed in various synthetic elastomers, natural rubber or elastomer blends. Carbon black, for example, is widely used as a reinforcing agent in natural rubber and other elastomers. Certain grades of commercially available carbon black are used, which vary both in surface area per unit weight and in structure, but have been limited by conventional rubber batch processing techniques. Numerous products of commercial significance are formed from such elastomeric compositions, including, for example, vehicle tires, engine mount bushings, conveyor belts, windshield wipers and the like. While a wide range of performance characteristics can be achieved employing currently available materials and manufacturing techniques, there has been a long standing need in the industry to develop elastomeric compositions having improved properties, especially elastomer compositions that can be produced effectively and economically.

SUMMARY

In accordance with a first aspect of the invention, there is provided an elastomer composite comprising an elastomer and particulate filler dispersed in the elastomer. The particulate filler comprises at least one carbon black having structure and surface area values which satisfy the equation $CDBP \leq (BET \div 2.9) - X$, wherein X is greater than or equal to 0. Such carbon blacks are referred to in some instances below as ultra-high surface area/low structure carbon blacks. Preferably, the elastomer is natural rubber. Additional ingredients, e.g., any of numerous additives and other fillers known for use in elastomer composites, may be included in the elastomer composites, such as to achieve desired performance properties, processing characteristics etc.

In accordance with another aspect of the invention, there is provided an elastomer composite comprising an elastomer and particulate filler dispersed in the elastomer having a tear strength, as measured for example, by test method ASTM-D624 using Die C of greater than about 160 N/mm, more preferably greater than about 165 N/mm, and most preferably greater than about 170 N/mm.

In accordance with another aspect of the invention, there is provided an elastomer composite comprising an elastomer and particulate filler dispersed in the elastomer having a Shore A hardness, as measured for example in accordance with test method ASTM-D1415, of greater than about 65, a tensile strength, as measured for example in accordance with test method ASTM-D412, of greater than about 30 megapascals, and an elongation at break, as measured for example in accordance with test method ASTM-D412 of greater than about 600%.

In accordance with another aspect of the invention, there is provided an elastomer composite comprising an elastomer and particulate filler dispersed in the elastomer, wherein the particulate filler comprises at least one carbon black in an amount such that the elastomer has tear strength, as measured by test method ASTM-D624 using Die C, of at least about 160 N/mm.

In accordance with another aspect of the invention, there is provided an elastomer composite comprising an elastomer and particulate filler dispersed in the elastomer, wherein the particulate filler comprises at least one carbon black in an amount such that the elastomer has Shore A hardness greater than about 65, as measured in accordance with test method ASTM-D1415, tensile strength greater than about 30 megapascals, as measured in accordance with test method ASTM-D412, and elongation at break greater than about 600%, as measured in accordance with test method ASTM-D412.

In accordance with another aspect of the invention, there is provided an elastomer composite comprising particulate filler dispersed in elastomer by methods referred to here as continuous wet mixing and coagulation wherein the carbon black has structure and surface area values satisfying the equation $CDBP \leq (BET \div 2.9) - X$, wherein X is greater than or equal to 0. Certain preferred embodiments of such elastomer composites have tear strength as measured by test method ASTM-D624 using Die C, of at least about 160 N/mm. Certain other preferred embodiments of such elastomer composites have Shore A hardness, as measured in accordance with test method ASTM-D1415, greater than about 65, tensile strength, as measured in accordance with test method ASTM-D412, greater than about 30 megapascals, and elongation at break, as measured in accordance with test method ASTM-D412, greater than about 600%.

In accordance with another aspect of the invention, there is provided elastomer blends comprising at least one elastomer composite disclosed above blended with an elastomer material. The elastomer material comprises at least one elastomer, which may be the same as, or different from, the elastomer in the elastomer composite. Optionally, the elastomer material comprises filler, e.g., carbon black, additives or other fillers dispersed in the elastomer.

In accordance with yet another aspect of the invention, there is provided a method of preparing the elastomer composites and elastomer blends disclosed above. This method comprises compounding or mixing the elastomer and the particulate filler, including the carbon black, and optionally other ingredients. In certain preferred embodiments such elastomer composites are produced by methods comprising continuous wet mixing and coagulation. Similarly, in certain preferred embodiments such elastomer blends are produced by methods comprising continuous wet mixing and coagulation followed by further compounding or mixing with additional elastomer material comprising at least one elastomer, which may be the same as, or different from, the elastomer in the elastomer composite. Optionally, the elastomer material comprises filler, e.g., carbon black, additives or other fillers dispersed in the elastomer.

These and other aspects and advantages will be further understood in view of the following detailed discussion of certain preferred embodiments.

DETAILED DESCRIPTION OF CERTAIN PREFERRED EMBODIMENTS

Preferred methods and apparatus for producing elastomer composites disclosed here are described in commonly assigned U.S. Pat. Nos. 6,075,084, 6,048,923, and 6,040,364, the entire disclosure of each of which is hereby incorporated herein by reference for all purposes. Such methods are referred to here in some instances as continuous wet mixing and coagulation. A preferred method for producing the elastomer composites comprises feeding a continuous flow of first fluid comprising elastomer latex to a mixing zone of a coagulum reactor defining an elongate coagulum zone extending from the mixing zone to a discharge end, and feeding a continuous flow of second fluid comprising particulate filler under pressure to the mixing zone of the coagulum reactor to form a mixture with the elastomer latex. The mixture passes as a continuous flow to the discharge end of the coagulum reactor, and the particulate filler is effective to coagulate the elastomer latex. More specifically, the second fluid is fed against the first fluid within the mixing zone sufficiently energetically to substantially completely coagulate the elastomer latex with the particulate filler prior to the discharge end of the coagulum reactor. A substantially continuous flow of elastomer composite is discharged from the discharge end. As noted above, these processes are referred to below in some instances as continuous wet mixing and coagulation.

In certain preferred embodiments, particulate filler slurry is fed to the mixing zone preferably as a continuous, high velocity jet of injected fluid, while the latex fluid typically is fed at relatively lower velocity. The high velocity, flow rate and particulate concentration of the filler slurry are sufficient to cause mixture and high shear of the latex fluid, flow turbulence of the mixture within at least an upstream portion of the coagulum zone, and substantially complete coagulation of the elastomer latex prior to the discharge end. Substantially complete coagulation can thus be achieved, in accordance with preferred embodiments, without the need of employing an acid or salt coagulation agent. Preferred continuous flow methods for producing the elastomer composites comprise continuous and simultaneous feeding of latex fluid and filler slurry to the mixing zone of the coagulum reactor, establishing a continuous, semi-confined flow of a mixture of the latex and filler slurry in the coagulum zone. Elastomer composite crumb in the form of "worms" or globules are discharged from the discharge end of the coagulum reactor as a substantially constant flow concurrently with the on-going feeding of the latex and carbon black slurry streams into the mixing zone of the coagulum reactor. Feed rates of the latex fluid and carbon black slurry to the mixing zone of the coagulum reactor can be precisely metered to achieve high yield rates, with little free latex and little undispersed carbon black in the product crumb at the discharge end of the coagulum reactor. High feed velocity of the carbon black slurry into the mixing zone of the coagulum reactor and velocity differential relative the latex fluid feed are believed to be significant in achieving sufficiently energetic shear of the latex by the impact of the particulate filler fluid jet for thorough mixing and dispersion of the particulate into the latex fluid and coagulation of the latex. Prior techniques involving premixing of latex and particulate filler, such as in the above-mentioned Heller et al patent and Hagopian et al patent, do not recognize the possibility of achieving coagulation without exposing the latex/particulate mixture to the usual coagulant solution with its attendant cost and waste disposal disadvantages. Modified and alternative suitable methods for producing novel elastomer composites disclosed here will be apparent to those skilled in the art, given the benefit of this disclosure.

Numerous carbon blacks are suitable for use in the elastomer composites disclosed here, including commercially available carbon blacks and fillers comprising carbon black. In addition to the carbon blacks specifically disclosed here, additional carbon blacks will be apparent to those skilled in the art, given the benefit of this disclosure.

In accordance with one aspect of this invention, there is provided an elastomer composite comprising carbon blacks having surface area and structure values satisfying equation (1):

$$CDBP \leq (BET \div 2.9) - X \quad (1)$$

wherein X is greater than or equal to 0. Preferably X is 0, and, when X is 0, Equation (1) may also be represented herein as "$CDBP \leq (BET \div 2.9)$."

In Equation (1), the structure value CDBP is the dibutylphthalate adsorption number after the sample has been crushed and is measured in accordance with the test procedure described in ASTM D-3493. The surface area value BET is nitrogen adsorption surface area and is measured in accordance with the test procedure described in ASTM D-4820. An example of a carbon black which satisfies this equation is BP1100, which has a CDBP value of about 43 to 45 mL/100 g and a BET value of about 260 to 264 $m^2/g$. Other preferred carbon blacks meeting Equation (1) include, for example, BP1180, BP880, and CSX439. It has now been found that certain preferred embodiments of elastomer composites disclosed here, comprising such ultra-high surface area/low structure carbon blacks, have advantageous performance properties and processing characteristics.

In accordance with certain preferred embodiments, elastomer composites are disclosed here comprising carbon blacks having surface area and structure values satisfying Equation (2):

$$CDBP \leq (BET \div 2.9) - X \quad (2)$$

wherein X is preferably about 5. More preferred are carbon blacks having surface area and structure values satisfying Equation (2) wherein X is about 10. It will be recognized, that the carbon blacks which satisfy Equation (2) are a subset of the carbon blacks which satisfy Equation (1). Additional suitable ultra-high surface area/low structure will be apparent to those skilled in the art, given the benefit of this disclosure.

Preferably, there is at least about 60 phr of ultra-high surface area/low structure carbon black in the elastomer composite. More preferably, there is at least about 65 phr of such ultra-high surface area/low structure carbon black in the elastomer composite, e.g., at least about 70 phr of such ultra-high surface area/low structure carbon black. Particularly preferred are such elastomer composites prepared by continuous wet mixing and coagulation and elastomer blends prepared by continuous wet mixing and coagulation and follow-on dry mixing with additional elastomer and/or other fillers, additives, etc. The advantageous elastomer composite properties disclosed here, such as high tensile strength, e.g., tensile strength over 160 N/mm, and good hardness, tensile strength and elongation, for example, are not found using traditional reinforcing carbon blacks.

The tear strength of the natural rubber elastomer composites comprising ultra-high surface area/low structure carbon black, e.g., carbon black BP1100, prepared by continuous wet mixing and coagulation exceeds the tear strength, as measured by test method ASTM-D624 using Die C, of natural rubber elastomer composites of the same formulation but produced by dry mixing. At least certain preferred embodiments of continuous wet mixing and coagulation elastomer composite comprising BP 1100 have now been found to achieve a value of 160 N/mm at less than about 65 phr filler and to exceed 160 N/mm at higher loading levels. The carbon black BP 1100 is commercially available from Cabot Corporation and, as noted above, has surface area and structure values meeting the equation CDBP≦(BET÷2.9). More specifically, as described above, BP 1100 has a BET surface area value of about 260 to 264 $m^2/g$ and a CDBP structure value of 43 to 45 mL/100 g. Also, it has now been found that the tear strength of such a BP 1100 continuous wet mixing and coagulation elastomer composite significantly exceeds the tear strengths of comparably formulated elastomer composites produced by dry-mixing with other commercially available carbon blacks not meeting the equation CDBP≦(BET÷2.9).

Comparative tear strength data also shows that the tear strength of elastomer composites comprising ultra-high surface area/low structure carbon black BP 1100, and produced by continuous wet mixing and coagulation, exceeds the tear strength of comparable elastomer composite comprising carbon black V7H, a non-ultra-high surface area/low structure carbon black, and produced by dry-mixing. Comparative tear strength data also shows that the tear strength of elastomer composites comprising BP 1100 and produced by continuous wet mixing and coagulation exceeds, at those tested loading levels between 50 and 110 phr, the tear strength of comparable elastomer composites comprising BP 1100 but produced by dry-mixing.

At least certain elastomer composites in accordance with this disclosure are suitable to be blended with additional elastomer, filler, other additives, etc. That is, at least certain of the elastomer composites disclosed here can be blended by subsequent dry-mixing with additional elastomer and/or filler or other additives, etc., including additional elastomer composites of the present invention Elastomer materials blended with elastomer composites disclosed here optionally comprise the same or different elastomer, and optionally may have carbon black and/or other filler or other additives dispersed therein.

Elastomer composites of the invention, particularly those prepared by continuous wet mixing and coagulation, can be incorporated into elastomer blends using a variety of techniques known in the art, including by subsequent dry mixing with additional elastomer material, e.g. a second elastomer or an elastomer composite already comprising fillers and/or additives, etc. The dry mixing can be carried out with any suitable apparatus and techniques, such as commercially available apparatus and techniques. In one embodiment, aBanbury mixer or the like is used. Other ingredients also may be added along with the additional elastomer during dry mixing, including, for example, extender oil, antioxidant, cure activators, additional particulate filler, curatives (for example, zinc oxide and stearic acid), etc. In those embodiments wherein additional filler is added during follow-on dry mixing, such additional filler can be the same as or different from filler(s) in the elastomer composite. The elastomer blends may optionally undergo further processing steps known to those skilled in the art.

Preferred methods of producing elastomer composite blend, comprising first preparing elastomer composite by continuous wet mixing and coagulation as described above, followed by dry mixing the elastomer composite with additional elastomer material to form elastomer blend, are described in U.S. Pat. No. 6,075,084, the entire disclosure of which is hereby incorporated herein by reference for all purposes. This process may be referred to in some instances as continuous wet mixing and coagulation with follow-on dry mixing. As stated above, at least certain preferred embodiments of the elastomer composites disclosed here are produced by continuous wet mixing and coagulation, and at least certain preferred embodiments of elastomer blends can be produced by continuous wet mixing and coagulation with follow-on dry mixing. In accordance with certain preferred embodiments, elastomer composites are produced by such continuous wet mixing and coagulation methods and apparatus, in a continuous flow process without the need for using traditional coagulating agents, such as acids or salts.

Advantageous flexibility is achieved by the method disclosed here for making elastomer blends, comprising continuous wet mixing and coagulation with follow-on dry mixing. In particular, flexibility is provided as to the choice of elastomer(s) employed in continuous wet mixing and coagulation and in the choice of elastomer(s) used in the subsequent dry mixing step. The same elastomer or mixture of elastomers can be used in the wet and dry mixing steps or, alternatively, different elastomers can be used in any suitable relative weight proportion. Further flexibility is provided in that additional filler and other additives and the like may optionally be added during either wet mixing or dry mixing. It should be understood that the dry mixing can be a multi-stage compounding process. Such additional materials can be the same as or different from those used in the continuous wet mixing and coagulation. Without wishing to be bound by theory, it presently is understood that, in at least certain preferred embodiments, a multi-phase elastomer composite blend is produced by continuous wet mixing and coagulation with follow-on dry mixing. That is, although difficult to identify or observe using techniques currently in general use in the elastomer industry, the elastomer blend is understood to comprise at lease one elastomer phase produced by continuous wet mixing and coagulation and another elastomer phase added or produced by follow-on dry mixing. The degree of mixing or blending of the two phases and the degree to which boundary layers between the two phases are more or less distinct will depend on numerous factors, including, for example, the mutual affinity of the elastomers, the level of filler loading, the choice of filler(s) and whether additional filler is added during dry mixing, the relative weight proportion of the continuous wet mixing and coagulation elastomer and the dry mixing elastomer, etc.

Numerous elastomers suitable for use in the elastomer composites disclosed here are commercially available or are otherwise known and prepared according to known techniques. Suitable elastomers include, but are not limited to, natural rubber, which is preferred, and other rubbers and polymers (e.g., homopolymers, copolymers, terpolymers, etc., all referred to here generally as polymers or copolymers unless otherwise stated or otherwise clear from context) of 1,3-butadiene, styrene, isoprene, isobutylene, 2,3-dimethyl-1,3-butadiene, acrylonitrile, ethylene, and propylene and the like. In accordance with certain preferred embodiments, the elastomer has a glass transition temperature (Tg), as measured by differential scanning calorimetry (DSC), ranging from about −120° C. to about 0° C. Examples include, but are not limited to, natural rubber and its derivatives such as chlorinated rubber, styrene-butadiene rubber (SBR), polybutadiene, polyisoprene, poly(stryene-co-butadiene) and the oil extended derivatives of any of them. Blends of any of the foregoing may also be used.

In certain preferred embodiments employing continuous wet mixing and coagulation, suitable elastomers are employed as latex fluids, e.g., natural or synthetic elastomer latices and latex blends. The latex preferably is suitable for coagulation by the selected particulate filler and must be suitable for the intended purpose or application of the final rubber product. It will be within the ability of those skilled in the art to select suitable elastomer latex or a suitable blend of elastomer latices for use in continuous wet mixing and coagulation to produce elastomer composites disclosed here, given the benefit of this disclosure. Exemplary elastomers include, but are not limited to, natural rubber and latices of the other elastomers recited above. The latex may be in an aqueous carrier liquid. Alternatively, the liquid carrier may be a hydrocarbon solvent. In any event, the elastomer latex fluid must be suitable for controlled continuous feed at appropriate velocity, pressure and concentration into the mixing zone. Suitable synthetic rubber latices include, for example, copolymers of from about 10 to about 70 percent by weight of styrene and from about 90 to about 30 percent by weight of butadiene, such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine 2-methyl-5-vinylpyridine, alkyl-substituted acrylates, vinyl ketone, methyl isopropenyl ketone, methyl vinyl either, and alphamethylene carboxylic acids and the esters and amides thereof, such as acrylic acid and dialkylacrylic acid amide. Also suitable are copolymers of ethylene and other high alpha olefins such as propylene, 1-butene and 1-pentene.

Elastomers suitable for use in elastomer blends disclosed here, that is, elastomers suitable for addition to the disclosed elastomer composites, include numerous elastomers that are commercially available or are otherwise known and prepared according to known techniques. Exemplary elastomers include those listed above for use in the elastomer composites. In certain preferred embodiments of the elastomer blends, specifically, those produced by continuous wet mixing and coagulation and follow-on dry mixing with additional elastomer, the additional elastomer during the dry mixing step can be any elastomer or mixture of elastomers suitable to the intended use or application of the finished product, including those listed above for use in continuous wet mixing and coagulation. In accordance with certain preferred embodiments, the elastomer latex employed in continuous wet mixing and coagulation is natural rubber latex and the additional elastomer employed in the dry mixing step is butadiene rubber (BR). In such preferred embodiments, the butadiene rubber preferably forms the minor phase or constituent of the elastomer composite blend, most preferably being from 10% to 50% by weight of total elastomer in the elastomer composite blend. In accordance with certain other preferred embodiments, the elastomer latex employed in continuous wet mixing and coagulation is natural rubber latex and the additional elastomer employed in the dry mixing step is styrene-butadiene rubber (SBR). In such preferred embodiments, the SBR preferably forms the major phase or constituent of the elastomer composite blend, most preferably being from 50% to 90% by weight of total elastomer in the elastomer composite blend. In accordance with certain other preferred embodiments, the additional elastomer is natural rubber. In accordance with certain other preferred embodiments, the elastomer latex employed in continuous wet mixing and coagulation is butadiene rubber latex and the additional elastomer employed in the dry mixing step is SBR. In such preferred embodiments, the SBR preferably is from 10% to 90% by weight of the total elastomer in the elastomer composite blend. In accordance with certain other preferred embodiments, the elastomer latex employed in continuous wet mixing and coagulation is butadiene rubber latex and the additional elastomer employed in the dry mixing step is natural rubber. In such preferred embodiments, the natural rubber preferably is the minor constituent or phase of the elastomer composite blend, most preferably being from 10% to 50% by weight of total elastomer in the elastomer composite blend. In accordance with certain other preferred embodiments employing butadiene rubber latex in continuous wet mixing and coagulation, the additional elastomer is additional butadiene rubber. In accordance with certain other preferred embodiments, the elastomer latex employed in continuous wet mixing and coagulation is SBR and the additional elastomer is butadiene rubber. In such preferred embodiments, the butadiene rubber preferably is from 10% to 90% by weight of total elastomer in the elastomer composite blend. In accordance with certain other preferred embodiments, the elastomer latex employed in continuous wet mixing and coagulation is SBR and the additional elastomer is natural rubber. In such preferred embodiments, the natural rubber preferably is the major constituent or phase, most preferably being from 50% to 90% by weight of total elastomer in the elastomer composite blend. Certain other preferred embodiments SBR is employed in both the wet mixing and dry mixing steps, thus being essentially 100% of the elastomer in the elastomer composite blend.

Where the elastomer latex employed in continuous wet mixing and coagulation comprises natural rubber latex, the natural rubber latex can comprise field latex or latex concentrate (produced, for example, by evaporation, centrifugation or creaming). The natural rubber latex in such embodiments preferably is suitable for coagulation by the carbon black. The latex is provided typically in an aqueous carrier liquid. Alternatively, the liquid carrier may be a hydrocarbon solvent. In any event, the natural rubber latex fluid must be suitable for controlled continuous feed at appropriate velocity, pressure and concentration into the mixing zone. The well-known instability of natural rubber latex is advantageously accommodated in certain preferred embodiments employing continuous wet mixing and coagulation, wherein it is subjected to relatively low pressure and low shear throughout the system until it is entrained into a semi-confined turbulent flow upon encountering a carbon black slurry feed stream jet of high velocity and kinetic energy in the mixing zone of a coagulum reactor. In certain preferred embodiments, for example, the natural rubber is fed to the mixing zone at a pressure of about 5 psig, at a feed velocity in the range of about 3-12 ft. per second, more preferably about 4-6 ft. per second. Selection of a suitable latex or blend of latices will be well within the ability of those skilled in the art given the benefit of the present disclosure and the knowledge of selection criteria generally well recognized in the industry.

As disclosed above, certain preferred embodiments of the elastomer composites of the invention comprise carbon blacks capable of providing the elastomer composite advantageous tear strength properties. In accordance with certain preferred embodiments, elastomer composites disclosed here comprise general purpose rubber and particulate filler dispersed in the elastomer, wherein the particulate filler comprises at least one carbon black effective or sufficient in selected concentrations in the elastomer to achieve tear strength, as measured by test method ASTM-D624 using Die C, of at least about 160 N/mm. Examples of a general purpose rubber include, but are not limited to, natural rubber, polyisoprene, polybutadiene, styrene-butadiene rubber, nitrile-butadiene rubber, or ethylene-propylene rubber (including EPDM). Preferably such general purpose rubber is natural rubber.

As disclosed above, certain preferred embodiments of the elastomer composites disclosed here comprise carbon blacks capable of providing the elastomer composite advantageous hardness, tensile strength and elongation at break. In accordance with certain preferred embodiments, elastomer composites disclosed here comprise elastomer and particulate filler dispersed in the elastomer, wherein the particulate filler comprises at least one carbon black effective or sufficient in selected concentrations in the elastomer to achieve:

Shore A hardness, measured in accordance with test method ASTM-D1415, greater than about 65;
tensile strength, measured in accordance with test method ASTM-D412, greater than about 30 megapascals; and
elongation at break, measured in accordance with test method ASTM-D412, of at least about 600%.

In certain such preferred embodiments, the elastomer composite comprises elastomer and particulate filler dispersed in the elastomer, and the elastomer composite has Shore A hardness greater than about 65, tensile strength greater than about 30 megapascals, and elongation at break greater than about 600%. Preferred embodiments comprise at least one ultra-high surface area/low structure carbon black, more preferably at least one ultra-high surface area/low structure carbon black.

Optionally, the filler employed in the elastomer composite comprises one or more materials additional to the aforesaid carbon black. In embodiments prepared by continuous wet mixing and coagulation, and for embodiments of the elastomer blends disclosed here prepared by continuous wet mixing and coagulation and follow-on dry mixing, the carbon black filler of the elastomer composite can include also other material that can be slurried and fed to the mixing zone in accordance with the principles disclosed here. Suitable additional materials include, for example, conductive fillers, reinforcing fillers, fillers comprising short fibers (typically having an L/D aspect ratio less than 40), flakes, etc. Thus, exemplary particulate fillers which can be employed in elastomer composites disclosed here include, for example, other carbon blacks, fumed silica, precipitated silica, coated carbon blacks such as silica-coated carbon blacks, modified carbon blacks such as those having attached organic groups, and treated carbon blacks including metal-treated carbon blacks (for example silicon-treated carbon blacks), either alone or in combination with each other. Suitable modified carbon blacks include those disclosed in U.S. Pat. Nos. 5,851,280, 5,672,198, 6,042,643, 5,900,029, and 5,559,169 and U.S. patent application Ser. No. 09/257,237, the entire disclosures of which are hereby incorporated by reference for all purposes. Suitable treated carbon blacks and coated carbon blacks are known and include those disclosed in U.S. Pat. Nos. 5,916,934, 5,830,930, 6,028,137, 6,008,272, 5,919,841, 6,017,980, 5,904,762, 6,057,387, and 6,211,279 and U.S. patent application Ser. Nos. 09/392,803 and 09/813,439, the entire disclosures of which are hereby incorporated by reference herein for all purposes. For example, in such silicon-treated carbon blacks, a silicon containing species, such as an oxide or carbide of silicon, is distributed through at least a portion of the carbon black aggregate as an intrinsic part of the carbon black. Also for example, in such silicon-coated carbon blacks, a silicon containing species, such as silica, is disposed on at least a portion of the surface of the carbon black aggregates. Additional materials and additives suitable to be employed with the aforesaid carbon blacks in the elastomer composites disclosed here will be apparent to those skilled in the art, given the benefit of this disclosure.

The rubber compositions of the present invention may optionally contain various additives along with the elastomer and filler, such as curing agents, coupling agents, and optionally, various processing aids, oil extenders and anti-degradents. Examples of additives include, but are not limited to, antiozonants, antioxidants, plasticizers, resins, flame retardants, and lubricants. Combinations of additives can also be used. In that regard, it should be understood that the elastomer composites of the invention include vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without substantial loss of performance characteristics. Thus, in making or further processing the elastomer composite blends, one or more curing agents such as, for example, sulfur, sulfur donors, activators, accelerators, peroxides, and other systems used to effect vulcanization of the elastomer composition may be used.

The elastomer composite produced by continuous wet mixing and coagulation may optionally undergo further processing. For example, the elastomer composite may be further processed in a mixing and compounding apparatus, such as a continuous compounder. Suitable continuous compounders are described in PCT Publication No. WO 00/62990, the entire disclosure of which is hereby incorporated herein by reference for all purposes.

A significant advantage has now been recognized in preparing elastomer composites by continuous wet mixing and coagulation. Specifically, excellent abrasion resistance is achieved, even in elastomer composites comprising oil to reduce hardness. Typically, hardness of an elastomer composite increases as the amount of filler in the composite is increased. Often, an intended use of an elastomer composite calls for high carbon black loading. However, the intended use of the elastomer composite may also call for lower hardness. It is known to add oil to reduce hardness of an elastomer composite, but if the amount of oil in an elastomer is increased to avoid undesirable hardness, the abrasion resistance of the elastomer composite generally is reduced. Elastomer composites prepared by continuous wet mixing and coagulation, including at least certain preferred embodiments of the elastomer composites disclosed here, achieve high abrasion resistance, notwithstanding high filler content and correspondingly high amounts of oil to control hardness. That is, abrasion resistance is found to be higher than in corresponding dry mixed elastomer composites. For example, novel elastomer composites made by continuous wet mixing and coagulation with loading levels of Vulcan 7H greater than 50 phr have higher abrasion resistance than corresponding dry mixed elastomer composite of the same formulation. It should be understood that the absolute value of abrasion resistance will depend on choice of filler, elastomer and oil, as well as filler and oil loading levels, etc. For comparable formulations, however, elastomer composites produced by continuous wet mixing and coagulation, such as certain preferred embodiments of the elastomer composites disclosed here, have advantageously higher abrasion resistance than corresponding elastomer composites of the same formulation prepared using dry mixing techniques in accordance with the best commercial practices.

Elastomer composites were prepared using continuous wet mixing and coagulation and tested for abrasion resistance. Abrasion resistance was found generally to increases to a maximum and then decreases with increasing filler loading. It is also seen that the abrasion resistance of continuous wet mixing and coagulation elastomer composites is generally greater than that of corresponding dry-mixed elastomer composite, especially at the higher carbon black loading levels. For example, the abrasion resistance of a natural rubber elastomer composite prepared using continuous wet mixing and coagulation and carbon black BP1100 and H65 oil was found to be greater than the abrasion resistance of a comparable elastomer composite prepared using dry mixing methods. At 50 phr filler loading, the elastomer composite prepared using continuous wet mixing and coagulation exhibits a 200% increase in abrasion resistance over that of the analogous elastomer composite prepared using dry mixing. The abrasion resistance of natural rubber elastomer composites over a series of filler loading levels, prepared by continuous wet mixing and coagulation and employing carbon black Vulcan7H and H65 oil was found to be greater than the abrasion resistance of comparable elastomer composites prepared using dry mixing methods. The abrasion resistance of natural rubber elastomer composites over a series of filler loading levels, prepared by continuous wet mixing and coagulation and employing carbon black BP 1100, was found to be greater than the abrasion resistance of comparable elastomer composites prepared using dry mixing methods. At 80 phr filler loading, the elastomer composite prepared using the continuous wet mixing and coagulation exhibits 300% greater abrasion resistance than that of the corresponding elastomer composite prepared by dry mixing. Thus, using the continuous wet mixing and coagulation, especially employing ultra-high surface are/low structure carbon blacks, elastomer composites having high abrasion resistance can be produced.

As used here, the carbon black structure can be measured as the dibutyl phthalate adsorption (DBPA) value, expressed as cubic centimeters of DBPA per 100 grams carbon black, according to the procedure set forth in ASTM D2414. The carbon black surface area can be measured as CTAB expressed as square meters per gram of carbon black, according to the procedure set forth in ASTM D3765-85. Measurements of BET and CDBP values are as described previously above.

EXAMPLES

For each of the following examples, elastomer composite was produced comprising natural rubber from field latex, BP1100 carbon black available from Cabot Corporation, and aromatic oil. The properties of the natural rubber field latex are provided in Table 1 below:

TABLE 1

| Natural rubber field latex properties | |
|---|---|
| Total solids content, % (m/m) | 32.8 |
| Dry rubber content, % (m/m) (50:50 Ethanol/acetic acid) | 31.9 |
| Total alkalinity, NH3, % (g/100 g latex) | 0.510 |
| VFA g KOH equiv. to the VFA in 100 g latex solids | 0.053 |

TABLE 1-continued

| Natural rubber field latex properties | |
|---|---|
| Acetone extract | 2.11 |
| Mooney viscosity ML (1 + 4) @100° C. | 90 |
| Mw | 1565976 |
| Mn | 1170073 |

The full formulation of the elastomer composite is set forth in Table 2 below.

TABLE 2

| Formulations | |
|---|---|
| Ingredient | phr |
| Rubber | 100 |
| BP1100 | 50–110 |
| Aromatic oil | 0–30 |
| ZnO | 4 |
| Stearic Acid | 2 |
| 6PPD (antioxidant) | 1 |
| TBBS (accelerator) | 1.2 |
| Sulfur | 1.8 |

Examples 1-3

The following procedure, which is similar to that described in U.S. Pat. No. 6,048,923, was used to prepare the elastomer composites of Examples 1-3.

1. Carbon Black Slurry Preparation

Bags of carbon black were dry ground and subsequently mixed with water in a carbon black slurry tank equipped with an agitator to form a 16.8 wt % carbon black slurry. This crude slurry was then fed to a homogenizer at an operating pressure of about 3000 psig such that the slurry was introduced as a jet into the mixing zone at a flow rate of about 780 kg/hr, to produce a finely ground carbon black slurry.

2. Latex Delivery

The latex, which was initially charged to a tank, was pumped to the mixing zone of the coagulum reactor. The latex flow rate was adjusted in order to obtain the desired final carbon black loading levels. Latex flow rates of between 430 to 600 kg/hr gave carbon black loading levels of between 80 and 95 phr (higher latex flow rates giving lower black loading levels). No antioxidant and oil were added in the latex.

3. Carbon Black and Latex Mixing

The carbon black slurry and latex were mixed by entraining the latex into the carbon black slurry. During entrainment, the carbon black was intimately mixed into the latex and the mixture coagulated. Soft, wet spongy "worms" of coagulum exited the coagulum reactor.

4. Dewatering

The wet crumb discharged from the coagulum reactor was dewatered to 10 to 25% moisture with a dewatering extruder (The French Oil Machinery Company, 7 inch diameter). In the extruder, the wet crumb was compressed and water squeezed from the crumb and through a slotted barrel of the extruder.

5. Drying and Cooling

The dewatered crumb was dropped into a continuous mixer where it was masticated and mixed with oil and antioxidant. Product exit temperature was less than 160° C. and the moisture content was about 2%.

Tear Strength

Tear test results for the elastomer composites of Examples 1-3 are shown in Table 3 below.

TABLE 3

| | Tear strength (Die C) | | |
|---|---|---|---|
| | Example No. | | |
| | 1 | 2 | 3 |
| Carbon black, phr | 80 | 88 | 95 |
| Aromatic oil, phr | 22 | 0 | 22 |
| Tear strength, N/mm | 160 | 177 | 169 |

Comparative Examples 1-3

The elastomer composites of Comparative Examples 1-3 were prepared using a BR 1600 Banbury Mixer (Farrel). The mixing procedures are shown in Table 4.

TABLE 4

| | Dry mix preparation |
|---|---|
| Stage 1 Time (min) | Farrel BR Banbury Mixer (1600 cc), 70% fill factor, 80 rpm, 45° C. Operation |
| 0 | Add polymer |
| 0.5 | Add filler |
| 2.5 | Add oil (if any) |
| 4 | Sweep |
| 5 or 8 | Dump Pass through open mill 3 times |
| Stage 2 Time (min) | Farrel BR Banbury Mixer (1600 cc) 65% fill factor, 60 rpm, 45° C. Operation |
| 0 | Add Stage 1 compound and curatives |
| 2 | Dump Pass through open mill 3 times Sit at room temperature for at least 2 hours |

The resulting elastomeric composites were tested for tear strength (Die C). The results are shown in Table 5.

TABLE 5

| | Tear strength (Die C) | | |
|---|---|---|---|
| | Comparative Example No. | | |
| | 1 | 2 | 3 |
| Carbon black, phr | 80 | 90 | 100 |
| Aromatic oil, phr | 22 | 0 | 22 |
| Tear strength, N/mm | 93 | 59 | 94 |

As can be seen comparing the results shown in Table 3 with those in Table 5, elastomer composites of the present invention have considerably higher tear strength than those prepared using a conventional dry mixing method.

Although the present invention has been described above in terms of specific embodiments, it is anticipated that other uses, alterations and modifications thereof will become apparent to those skilled in the art given the benefit of this disclosure. It is intended that the following claims be read as covering such alterations and modifications as fall within the true spirit and scope of the invention.

What is claimed is:

1. An elastomer blend comprising an elastomer composite blended with at least one elastomer material, the elastomer composite comprising a first elastomer and particulate filler dispersed in the first elastomer, the particulate filler comprising at least one carbon black having structure and surface area values meeting the equation $CDBP \leq (BET \div 2.9) - X$, wherein X is greater than or equal to zero.

2. An elastomer blend in accordance with claim 1 wherein the elastomer material comprises elastomer different from the first elastomer.

3. An elastomer blend in accordance with claim 1 wherein the elastomer composite, before blending, has tear strength, as measured by test method ASTM-D624 using Die C, of at least about 160 N/mm.

4. An elastomer blend in accordance with claim 1 wherein the elastomer composite, before blending, has Shore A hardness, measured in accordance with test method ASTM-D 1415, greater than about 65;

tensile strength, measured in accordance with test method ASTM-D412, greater than 30 megapascals; and elongation at break, measured in accordance with test method ASTM-D412, of at least about 600%.

5. A method of producing an elastomer composite comprising an elastomer and particulate filler dispersed in the elastomer, the method comprising:

feeding a continuous flow of first fluid comprising elastomer latex to a mixing zone; and feeding a continuous flow of second fluid comprising the particulate filler under pressure to the mixing zone to form a mixture, the mixing of the first fluid and the second fluid within the mixing zone being sufficiently energetic to substantially completely coagulate the elastomer latex with the particulate filler;

the particulate filler comprising at least one carbon black having structure and surface area values meeting the equation $CDBP \leq (BET \div 2.9) - X$, wherein X is greater than or equal to zero.

6. The method of claim 5 wherein the elastomer composite has tear strength, as measured by test method ASTM-D624 using Die C, of at least 160 N/mm.

7. The method of claim 5 further comprising blending the elastomer composite with an elastomer material to form an elastomer blend.

8. The method of claim 7 wherein blending the elastomer composite with the elastomer material comprises dry mixing the elastomer composite with the elastomer material.

9. The method of claim 7 wherein the elastomer material comprises additional filler.

10. The method of claim 5 further comprising blending the elastomer composite with additional filler.

11. The method of claim 5 wherein the elastomer composite has tear strength, as measured by test method ASTM-D624 using Die C, of at least 160 N/mm.

12. The method of claim 5 wherein the elastomer composite has

Shore A hardness, as measured by test method ASTM D1415, of at least 65, tensile strength, as measured by test method ASTM D412, of at least 30 megapascals, and elongation, as measured by test method ASTM D412, of at least 600%.

13. The elastomer blend of claim 1 wherein the particulate filler comprises carbon black having structure and surface area values meeting the equation $CDBP \leq (BET \div 2.9) - X$, wherein X is about 5.

14. The method of producing an elastomer blend of claim 5 wherein said carbon black has structure and surface area values meeting the equation $CDBP \leq (BET \div 2.9) - X$, wherein X is about 5.

* * * * *